United States Patent
Choi et al.

(10) Patent No.: US 10,351,735 B2
(45) Date of Patent: Jul. 16, 2019

(54) CONDUCTIVE ADHESIVE AND BONDING METHOD OF COMPOSITE MATERIAL USING THE CONDUCTIVE ADHESIVE

(71) Applicant: HYUNDAI MOTOR COMPANY, Seoul (KR)

(72) Inventors: Young Ho Choi, Seongnam-Si (KR); Kie Youn Jeong, Hwaseong-Si (KR); Seok Hwan Kim, Suwon-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 594 days.

(21) Appl. No.: 14/954,880

(22) Filed: Nov. 30, 2015

(65) Prior Publication Data
US 2016/0333231 A1 Nov. 17, 2016

(30) Foreign Application Priority Data
May 15, 2015 (KR) .................. 10-2015-0067966

(51) Int. Cl.
| | |
|---|---|
| *C09J 9/02* | (2006.01) |
| *C08K 9/02* | (2006.01) |
| *C09J 11/04* | (2006.01) |
| *C09J 163/00* | (2006.01) |
| *C09J 5/00* | (2006.01) |

(Continued)

(52) U.S. Cl.
CPC . *C09J 9/02* (2013.01); *C09J 5/00* (2013.01); *C09J 11/04* (2013.01); *C09J 163/00* (2013.01); *C08K 3/04* (2013.01); *C08K 7/06* (2013.01); *C08K 9/02* (2013.01); *C08K 2201/001* (2013.01); *C09J 2201/602* (2013.01); *C09J 2463/00* (2013.01)

(58) Field of Classification Search
CPC ...................................... C09J 9/02; C08K 9/02
See application file for complete search history.

(56) References Cited

U.S. PATENT DOCUMENTS

| | | | |
|---|---|---|---|
| 6,384,128 B1 * | 5/2002 | Wadahara | C08K 3/04 524/496 |
| 2008/0099732 A1 * | 5/2008 | Nagao | C08J 5/042 252/511 |

(Continued)

FOREIGN PATENT DOCUMENTS

| | | | |
|---|---|---|---|
| JP | H0742449 B2 | 5/1995 | |
| JP | 2000191987 A * | 7/2000 | H01L 24/29 |

(Continued)

OTHER PUBLICATIONS

Machine English language translation of JP 2000-191987 A, published Jul. 11, 2000. (Year: 2000).*

(Continued)

*Primary Examiner* — Vickey Nerangis
(74) *Attorney, Agent, or Firm* — Morgan, Lewis & Bockius LLP

(57) ABSTRACT

A conductive adhesive includes an adhesive of 80 to 90 wt % and a conductive fiber of 10 to 20 wt %. The conductive adhesive according to the present disclosure has excellent conductivity by mixing the conductive fiber with the one-component adhesive or the two-component adhesive to make electric conduction smoother, and to improve adhesion properties and durability regarding temperature changes.

7 Claims, 1 Drawing Sheet

(51) Int. Cl.
*C08K 3/04* (2006.01)
*C08K 7/06* (2006.01)

(56) References Cited

U.S. PATENT DOCUMENTS

2009/0053406 A1 2/2009 Ackerman
2012/0295104 A1 11/2012 Barker

FOREIGN PATENT DOCUMENTS

| | | |
|---|---|---|
| JP | 2004-027134 A | 1/2004 |
| JP | 2008297514 A * | 12/2008 |
| KR | 10-0197169 B1 | 6/1999 |
| KR | 10-2007-0102333 A | 10/2007 |
| KR | 10-2008-0098194 A | 11/2008 |
| KR | 10-2012-0104039 A | 9/2012 |
| KR | 10-2012-0138736 A | 12/2012 |
| KR | 10-2014-0053904 A | 5/2014 |
| KR | 10-2015-0013703 A | 2/2015 |

OTHER PUBLICATIONS

Machine translation of JP 2008-297514 A, published Dec. 11, 2008. (Year: 2008).*

* cited by examiner

CONDUCTIVE ADHESIVE AND BONDING METHOD OF COMPOSITE MATERIAL USING THE CONDUCTIVE ADHESIVE

CROSS-REFERENCE TO RELATED APPLICATION

This application claims, under 35 U.S.C. § 119(a), the benefit of priority to Korean Patent Application No. 10-2015-0067966, filed on May 15, 2015 with the Korean Intellectual Property Office, the entire contents of which are incorporated herein by reference.

TECHNICAL FIELD

The present disclosure relates to a conductive adhesive and a bonding method of a composite material using the conductive adhesive. More particularly, it relates to a conductive adhesive, which can have excellent conductivity by mixing a conductive fiber with a one-component adhesive or a two-component adhesive to make electric conduction smoother.

BACKGROUND

Due to fuel regulations, there is a need for weight reduction of a vehicle. Therefore, a lightweight composite material has been applied to vehicle shells, and in particular, a roof.

For combining the roof using this lightweight composite material and a vehicle body, mechanical joining is used and includes bolt fastening or riveting, and adhesive bonding is also used. Specifically, in the mechanical bonding method, an operator may insert a steel flange to a composite material roof for molding and then weld the flange to a vehicle body, but this has disadvantages that molding becomes complicates and weight may be increased by the steel part. Further, there is a method of perforating at the flange part and then bolting or riveting the flange to a vehicle body, but the process may become complicated because the perforation is added, and corrosion may occur due to a potential difference at the fastened region.

However, the adhesive bonding method has benefits in that it does not need a hole drilling process for fastening, weight is generally not increased, watertight properties are good, and load can be distributed over a large area. However thermal expansion with a material to be adhered should be considered, because a Coefficient of thermal expansion (CTE) of the adhesive may be different from that of the steel vehicle body and the composite material roof. Therefore, there is a disadvantage that stress may occur according to temperature changes of an external environment. Further, because electric conduction between the materials to be adhered becomes difficult, there is a disadvantage in that it is unfavorable to roof electric conduction of an electrostatic painting or electric conduction through an outside of a vehicle body when lightning occurs or strikes.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art.

The present disclosure is completed by the findings that excellent conductivity can be obtained by mixing a conductive fiber with a one-component adhesive or a two-component adhesive, thereby making electric conduction smoother, and improving adhesion property and durability according to temperature change, and also it is possible to be used for bonding a composite material part such as a roof to a vehicle body or bonding a composite material part for a hood, a door, a fender or a trunk lid to a steel part.

The present disclosure is objected to provide a conductive adhesive having excellent conductivity.

Further, the present disclosure is objected to provide a bonding method of a composite material for a vehicle using the conductive adhesive.

To achieve the above objects, the present disclosure includes the following constituents.

In one aspect, the present disclosure provides a conductive adhesive, which comprises a one-component adhesive or a two-component adhesive of 80 to 90 wt % and a conductive fiber of 10 to 20 wt %.

In another aspect, the present disclosure provides a bonding method of a composite material for a vehicle, which comprises: preparing a conductive fiber; manufacturing a conductive adhesive by mixing the conductive fiber of 10 to 20 wt % with an one-component adhesive or a two-component adhesive of 80 to 90 wt %; coating the conductive adhesive on a material to be adhered; and adhering a composite material on the material coated with the conductive adhesive.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
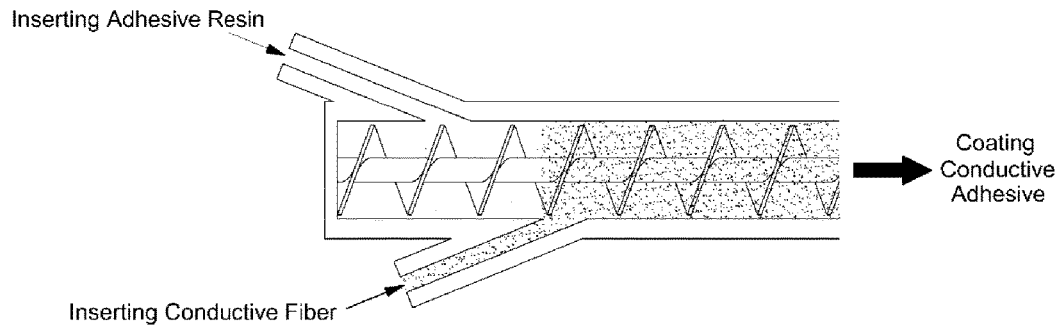
FIG. 1 is a drawing showing a process of manufacturing a conductive adhesive by mixing an adhesive and a conductive fiber using a stirring/dispending machine according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present disclosure provides a conductive adhesive, which may comprise a one-component adhesive or a two-component adhesive of 80 to 90 wt % and a conductive fiber of 10 to 20 wt %.

According to a preferred embodiment of the present disclosure, in order to secure conductivity, the conductive adhesive may comprise the conductive fiber of 10 to 20 wt %. Specifically, if the content of the conductive fiber is less than 10 wt %, electric conduction may be poor because it is hard to secure conductivity, and if it is over 20 wt %, stress may occur due to linear expansion coefficient difference of a steel vehicle body.

According to a preferred embodiment of the present disclosure, the adhesive may be the one-component adhesive or the two-component adhesive. Specifically, when coating is needed after a composite material for a vehicle (for example, a carbon fiber composite material) secures sufficient thermal resistance, bonding may be conducted using the two-component structural adhesive, and then the adhesive may be hardened while passing through a coating line. On the other hand, when the composite material for a vehicle does not secure enough thermal resistance of a coating line, or transparent coating is needed for a carbon fiber pattern, adhesion to the coated vehicle body can be conducted using a room temperature cure type one-component structural adhesive. The one-component or two-component adhesive may be at least one selected from the group consisting of epoxys, urethanes and acrylates.

According to a preferred embodiment of the present disclosure, the conductive fiber may be a carbon fiber, a carbon fiber plated with a conductive metal, or a mixture thereof. The conductive fiber may have excellent conductivity thereby making electric conduction smoother, and also improving durability regarding to temperature changes.

According to a preferred embodiment of the present disclosure, the conductive metal may be at least one selected from the group consisting of copper (Cu), zinc (Zn), silver (Ag), gold (Au), platinum (Pt), antimony (Sb), manganese (Mn), nickel (Ni), vanadium (V), indium (In), and tin (Sn).

According to a preferred embodiment of the present disclosure, the conductive metal may have an average thickness of 0.1 to 0.5 µm. Specifically, if it is thinner than 0.1 µm, it may be difficult to form an even conductive path, and if it is thicker than 0.5 µm, thickness of the adhered layer may be uneven or wear of a stirring/dispending machine may be accelerated.

According to a preferred embodiment of the present disclosure, in the carbon fiber plated with a conductive metal, the plating amount of the conductive metal may be 8 to 150 wt % based on the carbon fiber. Specifically, if the plating amount of the conductive metal is less than 8 wt %, it is may be difficult to form an even conductive path, and if it is over 150 wt %, processing may be difficult, and weight may be increased by a large degree.

According to a preferred embodiment of the present disclosure, the conductive fiber may have an average fiber length of 0.8 to 8 mm. Specifically, if fiber length is shorter than 0.8 mm, it may not be economic because a large amount of the conductive fiber is needed to form the conductive path, and if it is longer than 8 mm, an imbalance of adhesion thickness may be caused by a partial dispersion problem.

According to a preferred embodiment of the present disclosure, the conductive fiber may have an average fiber diameter of 2 to 12 µm. Specifically, if fiber diameter is smaller than 2 µm, there may be a benefit due to increased aspect ratio, but dispersion may be difficult and production costs may be increased. If fiber diameter is larger than 12 µm, cutting and processing may become difficult, and thickness of the adhered layer may be uneven. Preferably, an average fiber diameter of the conductive fiber may be 6 to 8 µm.

On the other hand, the bonding method of the composite material for a vehicle of the present disclosure may comprise: preparing a conductive fiber; manufacturing a conductive adhesive by mixing the conductive fiber of 10 to 20 wt % with the one-component adhesive or the two-component adhesive of 80 to 90 wt %; coating the conductive adhesive on a material to be adhered; and adhering a composite material on the material coated with the conductive adhesive.

According to a preferred embodiment of the present disclosure, in the step of preparing the conductive fiber, a cutting process of the conductive fiber may be conducted to have average fiber length of 0.8 to 8 mm. Specifically, the conductive fiber may be cut into the fiber length (0.8 to 8 mm) by rotating a cutter blade at a constant rate against a feeding rate.

According to a preferred embodiment of the present disclosure, in the step of manufacturing the conductive adhesive, the adhesive and the conductive fiber may be inserted through different inlets of the stirring/dispending machine and then mixed. Herein the stirring/dispending machine plays a role of mixing the adhesive and the conductive fiber, which are inserted into a stirring chamber, and coating the mixture on one side of a material to be adhered.

FIG. 1 is a drawing showing a process of manufacturing a conductive adhesive by mixing an adhesive and a conductive fiber using the stirring/dispending machine according to the present disclosure. Referring to FIG. 1, the one-component or the two-component adhesive is inserted through the first inlet, the conductive fiber is inserted through the second inlet, and then they are mixed.

According to a preferred embodiment of the present disclosure, the coating amount of the conductive adhesive may be 1.42 to 5.20 kg per adhesion unit area of the material to be adhered.

Thus, the conductive adhesive according to the present disclosure can have excellent conductivity by mixing the conductive fiber with the one-component adhesive or the two-component adhesive to make electric conduction smoother, and to improve adhesion properties and durability regarding temperature changes. Further, the conductive adhesive can be used for bonding the composite material part, such as a roof, to a vehicle body or bonding a composite material part for a hood, a door, a fender or a trunk lid to a steel part.

EXAMPLES

The following examples illustrate the disclosure and are not intended to limit the same.

Example 1

A conductive fiber consisting of 12,000 strands of nickel-plated carbon fibers was prepared, and cut into fiber length of 3 mm. The nickel-plated carbon fiber had thickness of 0.22 μm, and was plated with the nickel in an amount of 28 wt % based on the carbon fiber, and fiber diameter of the carbon fiber was 7 μm. Then, the conductive fiber of 12 wt % and a one-component adhesive of 88 wt % were mixed to manufacture a conductive adhesive. Herein, as the one-component adhesive, BETAMATE™ 1822 grade (structural adhesive from Dow Automotive System) was used. Then, the conductive adhesive was evenly coated on one side of a steel substrate (a material to be adhered), and then a composite material was overlapped thereon followed by adhering at 80° C. for 5 min for bonding.

Example 2

The procedure of Example 1 was repeated except mixing a conductive fiber, which was cut into fiber length of 6 mm, of 15 wt % and the one-component adhesive of 85 wt %.

Example 3

The procedure of Example 1 was repeated except mixing a conductive fiber, which was cut into fiber length of 1 mm, of 18 wt % and the one-component adhesive of 82 wt %.

Comparative Example 1

The conductive fiber was not mixed, and only the one-component adhesive was coated on the steel substrate (a material to be adhered), and then the composite material was overlapped thereon for adhering.

Comparative Example 2

The procedure of Example 1 was repeated except mixing the conductive fiber of 5 wt % and the one-component adhesive of 95 wt %.

Comparative Example 3

The procedure of Example 1 was repeated except mixing the conductive fiber of 35 wt % and the one-component adhesive of 65 wt %.

Comparative Example 4

The procedure of Example 1 was repeated except mixing a conductive fiber, which was cut into fiber length of 0.5 mm.

Comparative Example 5

The procedure of Example 1 was repeated except mixing a conductive fiber, which was cut into fiber length of 10 mm.

Test Example

For the composite materials, which were bonded using the conductive adhesives manufactured in Examples 1 to 3 and Comparative Examples 1 to 5, adhesive strength was evaluated, and the results are shown in the following Tables 1 and 2.

[Adhesive Strength Evaluation Method]

Figure 2A:
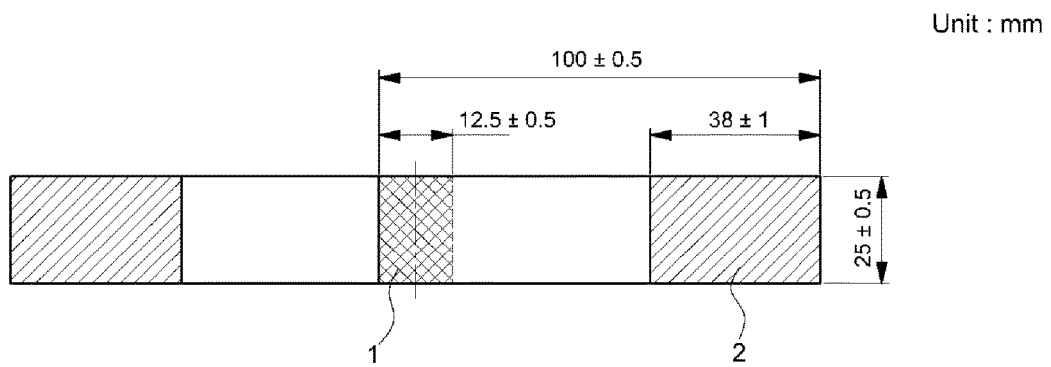
FIG. 2A is a plane view.
Figure 2B:
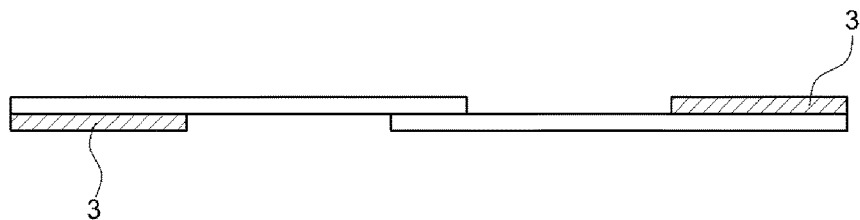
FIG. 2B is a sectional view, of a tensile lap-shear strength specimen for evaluating adhesive strength according to the present disclosure.

A tensile lap-shear strength specimen for evaluating adhesive strength was prepared, and evaluated according to ISO 4587. But, on one side of the specimen, a steel plate having tensile strength of 270 MPa grade was used, and on the other side, a woven carbon fiber of 50 vol % was used in an order of [0°/90°/45°/−45°/−45°/45°/90°/0°], and an epoxy resin was used as a base material to manufacture a 1.8 mm-thick specimen. FIG. 2A and FIG. 2B show a plane view and a sectional view of a tensile lap-shear strength specimen for evaluating adhesive strength according to the present disclosure.

Adhesive strength was evaluated by preparing a specimen as described above, and for measuring resistance value and a linear expansion coefficient, a film, which was casted between Teflon release films, was used. (Specific) resistance value was calculated by multiplying film thickness by surface resistance measured by 4-point measurement.

TABLE 1

| Section | Example 1 | Example 2 | Example 3 |
|---|---|---|---|
| Conductive Fiber Length (mm) | 3 | 6 | 1 |
| Conductive Fiber Content (wt %) | 12 | 15 | 18 |
| Adhesive Strength*[1] (MPa) | 26.8 | 27.2 | 28.3 |
| Resistance*[2] (Ω · m) | $1.2 \times 10^{-7}$ | $1.3 \times 10^{-7}$ | $9.7 \times 10^{-8}$ |
| Linear Expansion Coefficient ($10^{-6}$ m/m · K) | 14.2 | 13.7 | 12.6 |

*[1]ISO 4587 tensile lap-shear strength measurement (Single Lap Shear Joint Test), Pretreatment before adhesion was conducted according to ISO 17212
*[2]Resistance of adhesive layer
※ Linear expansion coefficient of steel: $13 \times 10^{-6}$ m/m · K,
Linear expansion coefficient of composite material (carbon fiber composite material roof): 2 to $14 \times 10^{-6}$ m/m · K

TABLE 2

| Section | Comparative Example 1 | Comparative Example 2 | Comparative Example 3 | Comparative Example 4 | Comparative Example 5 |
|---|---|---|---|---|---|
| Conductive Fiber Length (mm) | — | 3 | 3 | 0.5 | 10 |
| Conductive Fiber Content (wt %) | None | 5 | 35 | 12 | 12 |
| Adhesive Strength*[1] (MPa) | 22.8 | 23.9 | 16.2 | 25.7 | 17.6 |
| Resistance*[2] (Ω · m) | $4.83 \times 10^{11}$ | $1.3 \times 10^{-7}$ | $9.2 \times 10^{-8}$ | $6.3 \times 10^{-5}$ | $1.1 \times 10^{-8}$ |
| Linear Expansion Coefficient ($10^{-6}$ m/m · K) | 49.1 | 28.8 | 11.9 | 13.4 | 16.9 |

*[1]ISO 4587 tensile lap-shear strength measurement (Single Lap Shear Joint Test), Pretreatment before adhesion was conducted according to ISO 17212
*[2]Resistance of adhesive layer
※ Linear expansion coefficient of steel: $13 \times 10^{-6}$ m/m · K,
Linear expansion coefficient of composite material (carbon fiber composite material roof): 2 to $14 \times 10^{-6}$ m/m · K According to the results of the above Tables 1 and 2, it could be found that, as compared to Comparative Example 1 using only the adhesive, Examples 1, 2 and 3 have a low possibility of generating stress at the adhered surface by temperature changes of an external environment because the linear expansion coefficients of Examples 1, 2 and 3 are similar with the linear expansion coefficients of the steel and the composite material, and have improve durability because adhesive strength is increased. Further, they have excellent conductivity, and therefore, there is little worry for insulation between a vehicle body and the composite material.

On the contrary, it was confirmed that Comparative Example 2 containing less conductive fiber, which reinforces the adhesive layer, is poor in expansion behavior due to temperature changes because the linear expansion coefficient of Comparative Example 2 is different from the linear expansion coefficient of the steel.

Further, it was confirmed that in the cases of Comparative Examples 3 and 5, wherein the conductive fiber is contained too much or the fiber is too long, adhesive strength is reduced instead due to uneven dispersion. On the contrary, it was confirmed that in the case of Comparative Example 4, wherein the conductive fiber is too short, conductivity is reduced.

Thus, it was confirmed that the conductive adhesives manufactured in Examples 1, 2 and 3 have excellent conductivity by mixing the conductive fiber with the one-component adhesive, and therefore, they can make electric conduction smoother, and can improve adhesion properties and durability regarding temperature changes.

The conductive adhesive according to the present disclosure can have excellent conductivity by mixing the conductive fiber with the one-component adhesive or the two-component adhesive to make electric conduction smoother, and to improve adhesion properties and durability regarding temperature changes.

This can be used for bonding a composite material part, such as a roof, to a vehicle body or bonding a composite material part for a hood, a door, a fender or a trunk lid to a steel part.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A conductive adhesive comprises:
   an adhesive of 80 to 90 wt % and a conductive fiber of 10 to 20 wt %,
   wherein the conductive fiber has an average fiber length of 1 to 6 mm,
   wherein the conductive fiber is a carbon fiber plated with a conductive metal having an average thickness of 0.1 to 0.5 µm, and
   wherein the conductive adhesive has a Linear expansion coefficient of 12.6 to 14.2 m/m·K.

2. The conductive adhesive of claim 1, wherein the adhesive is selected from the group consisting of epoxys, urethanes and acrylates.

3. The conductive adhesive of claim 1, wherein the conductive metal comprises at least one selected from the group consisting of copper (Cu), zinc (Zn), silver (Ag), gold (Au), platinum (Pt), antimony (Sb), manganese (Mn), nickel (Ni), vanadium (V), indium (In), and tin (Sn).

4. The conductive adhesive of claim 1,
   wherein in the carbon fiber plated with a conductive metal, the plating amount of the conductive metal is 8 to 150 wt % based on the carbon fiber.

5. The conductive adhesive of claim 1, wherein the conductive fiber has an average fiber diameter of 2 to 12 µm.

6. The conductive adhesive of claim 1, wherein the adhesive comprises a one-component adhesive.

7. The conductive adhesive of claim 1, wherein the adhesive comprises a two-component adhesive.

* * * * *